United States Patent [19]

Dierickx

[11] Patent Number: 5,152,557
[45] Date of Patent: Oct. 6, 1992

[54] PLASTIC COUPLING WITH RING FOR ADHESION TO A TUBULAR MEMBER

[75] Inventor: P. Dierickx, Dadizele, Belgium

[73] Assignee: Jonaco GmbH, Zug, Switzerland

[21] Appl. No.: 613,662

[22] PCT Filed: Mar. 15, 1990

[86] PCT No.: PCT/BE90/00011
§ 371 Date: Nov. 26, 1990
§ 102(e) Date: Nov. 26, 1990

[87] PCT Pub. No.: WO90/11467
PCT Pub. Date: Oct. 4, 1990

[30] Foreign Application Priority Data

Mar. 17, 1989 [BE] Belgium .................. 8900294

[51] Int. Cl.⁵ ............................................. F16L 13/00
[52] U.S. Cl. ................................. 285/369; 285/21; 285/292; 285/297; 285/238; 285/917
[58] Field of Search .............. 285/369, 292, 294, 423, 285/915, 297, 238, 289, 21, 22

[56] References Cited

U.S. PATENT DOCUMENTS

| | | | |
|---|---|---|---|
| 2,739,829 | 3/1956 | Pedlow | 285/21 |
| 2,785,910 | 3/1957 | Munger | 285/915 X |
| 3,572,392 | 3/1971 | McLarty | 138/109 |
| 3,819,207 | 6/1974 | Leopold, Jr. | 285/369 X |
| 4,635,972 | 1/1987 | Lyall | 285/55 X |
| 4,810,010 | 3/1989 | Jones | 285/55 |
| 4,893,848 | 1/1990 | Melcher | 285/423 X |
| 4,903,998 | 2/1990 | Stanley | 285/423 X |
| 4,913,465 | 4/1990 | Abbema et al. | 285/55 X |
| 5,028,081 | 7/1991 | Fournier | 285/334.4 |

FOREIGN PATENT DOCUMENTS

| | | |
|---|---|---|
| 215403 | 1/1957 | Australia .................. 285/297 |
| 2805982 | 9/1965 | Australia . |
| 4050/66 | 10/1967 | Australia . |
| 0060448 | 9/1982 | European Pat. Off. . |
| 2240548 | 2/1974 | Fed. Rep. of Germany . |
| 8203087 | 8/1983 | Netherlands . |
| 506015 | 4/1971 | Switzerland . |

Primary Examiner—Randolph A. Reese
Assistant Examiner—Timothy Aberle
Attorney, Agent, or Firm—Foley & Lardner

[57] ABSTRACT

A coupling for joining two tubes is manufactured of a material different from the material of the tubes. The coupling includes two parts, which can be coupled to each other. Each part includes a body with an axial bore for receiving an end of the tube. The bore has an inner wall including a ring. The ring is made of a material which can adhere to the material of the tube. Two tubes made of different material can thus be coupled and uncoupled.

16 Claims, 3 Drawing Sheets

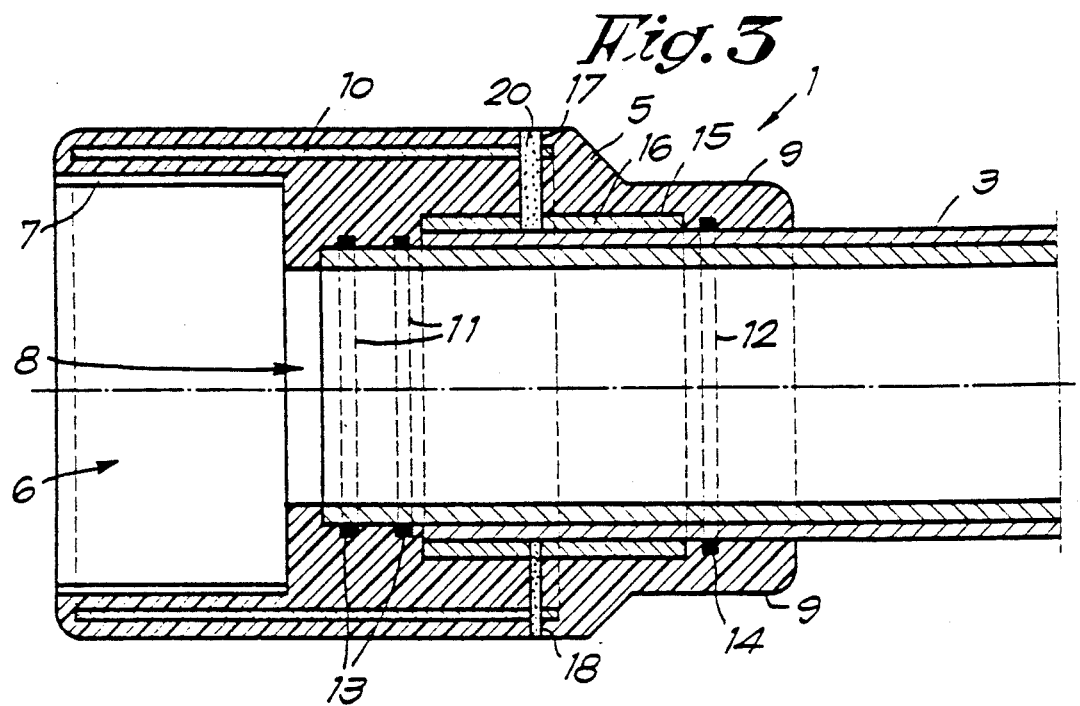
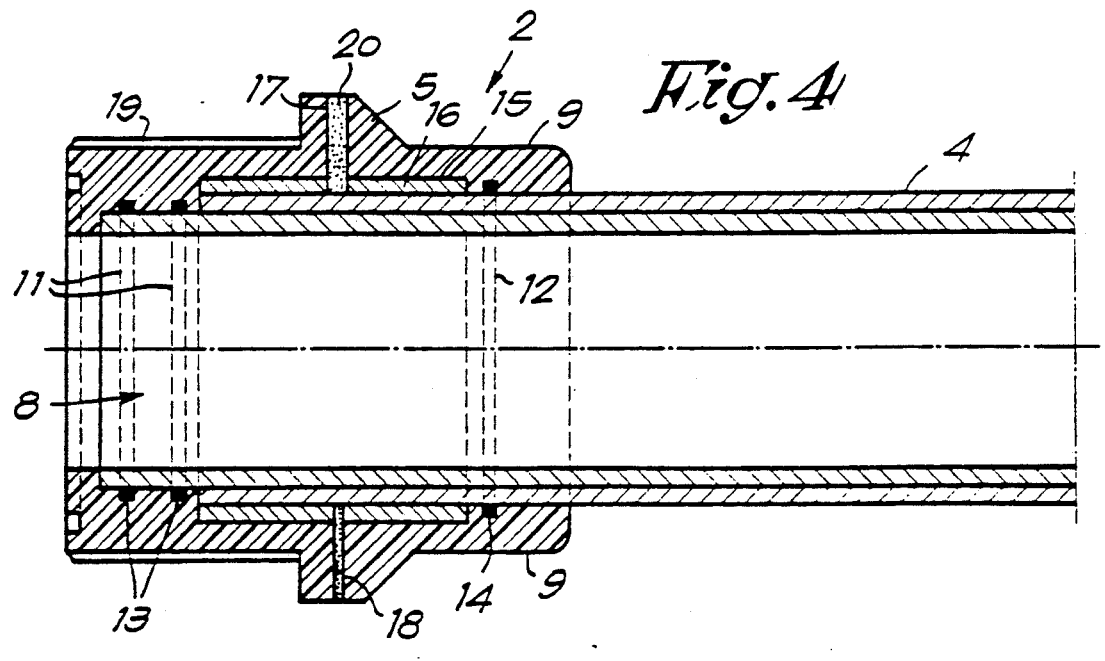

PLASTIC COUPLING WITH RING FOR ADHESION TO A TUBULAR MEMBER

BACKGROUND OF THE INVENTION

1. Field of the Invention

This invention relates to a plastic coupling for joining together two tubes in such a manner that the connection can be effected and severed repeatedly.

Still more especially the invention relates to a plastic coupling that is principally manufactured of a material that is different from the material of the tubes.

2. Discussion of the Related Art

It is known that with conventional glues or adhesives it is possible for the glue to stick very strongly on the condition that both elements to be joined are manufactured of the same materials.

In some cases, for the connection of two tubes, a coupling sleeve is used made of the same material as the tubes to which it is bonded, for example in the case of tubes and coupling sleeves in polyvinylchloride.

In other cases, whereby greater demands are put on the tubes and/or connection, it is desirable to utilise other materials including, for example, composite materials, such as polyester.

In such cases the manufacture of coupling sleeves in a composite material is a difficult if not impossible task. For example, the coupling sleeves would not be sufficiently strong or not be capable of being shaped into the desired form.

SUMMARY OF THE INVENTION

The invention relates to a plastic coupling that does not have these disadvantages and that consequently is principally manufactured of a suitable, strong plastic, whereby this coupling can nevertheless be stuck very effectively onto a tube of another material.

For this purpose the invention has a plastic coupling that is characterised in that is consists of two parts which can be coupled to each other, each of which is principally formed by a plastic body that is provided with an axial bore destined to receive the extremity of one of the two tubes, whereby the inner wall of that bore is at least partially formed by a ring covering the entire circumference, for example in metal or plastic, in the same material as the corresponding tube or in another hood adhesive material and whereby each plastic body may be still further provided with connecting means with which both can be directly or indirectly coupled to each other.

A similar plastic coupling can be stuck very strongly to the tube with a suitable glue, whereby both tubes can always be separated again by uncoupling the two parts of the coupling from each other.

BRIEF DESCRIPTION OF THE DRAWINGS

In order to show better the characteristics according to the present invention, some preferred embodiments are described hereafter, as examples without any restrictive character, with reference to the enclosed drawings, in which:

FIG. 3 shows a cross-section similar to that of FIG. 2 but whereby the part of the plastic coupling in question is bonded to a tube;

FIG. 4 shows a cross-section similar to that of FIG. 3 but in relation to the second part of the plastic coupling;

DETAILED DESCRIPTION OF THE PREFERRED EMBODIMENTS

The plastic coupling represented in the FIGS. 1 through 5 consists of two parts 1, 2 which can be screwed onto each other, each of which can be bonded respectively to a tube 3, 4, whereby both parts 1 and 2 of the plastic coupling are manufactured of a material that is different from the material of the tubes 3, 4.

Figure 1:
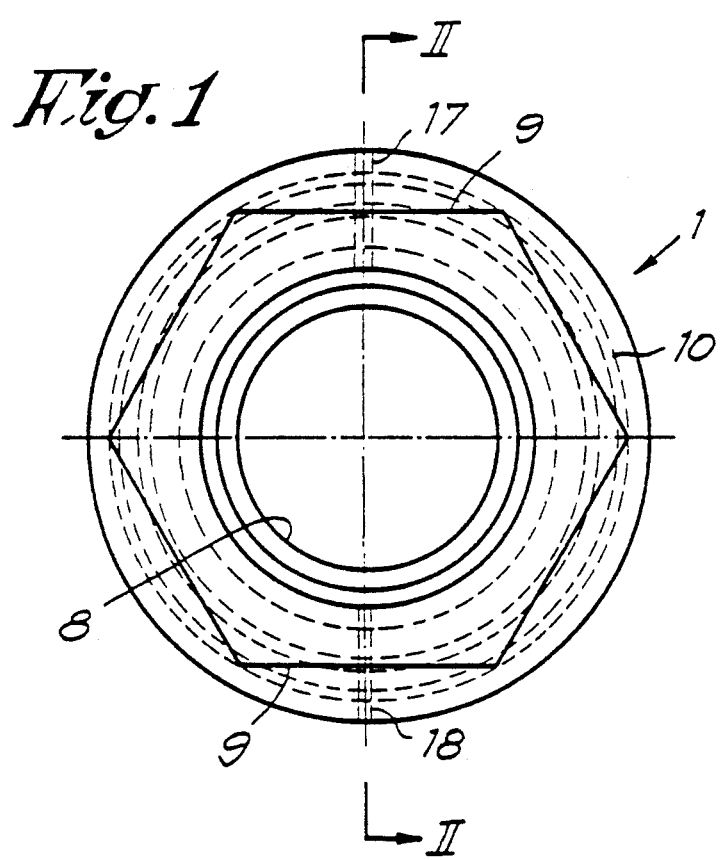
FIG. 1 shows a front view of one part of a plastic coupling according to the invention.
Figure 2:
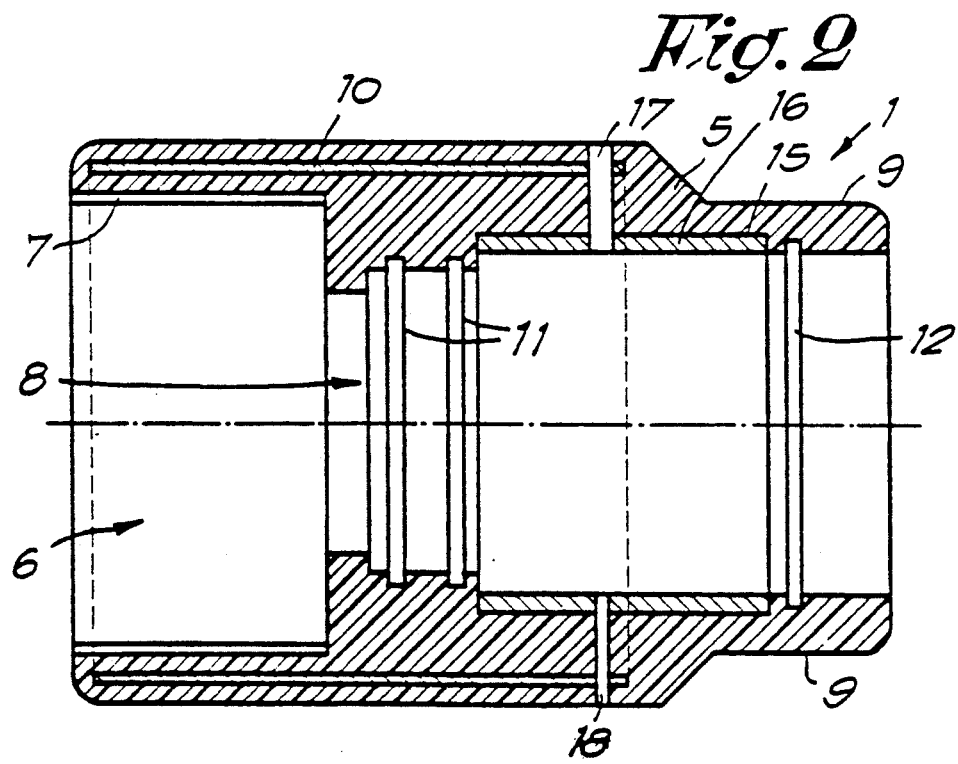
FIG. 2 shows a cross-section according to line II—II in FIG. 1.

Part 1 of the plastic coupling, shown in FIGS. 1, 2 and 3, is formed by a cylindrical body 5 in which an axial bore 6 with internal screw thread 7 and a smaller axial bore 8 connecting thereon are provided. As shown in FIGS. 1 and 2, the outside body 5 shows at least two flat surfaces 9 situated opposite each other, for placing a spanner or similar tool, in order to facilitate later tightening or loosening the coupling. These surfaces 9 can be part of a hexagon or otherwise shaped. The body 5 may be strengthened by an internal reinforcement formed by a perforated metal tube 10, which is useful as torsion reinforcement.

On both extremities of the axial bore 8, there is at least one peripheral groove 11 and 12 in which an elastic sealing ring, respectively 13 and 14 is provided. Between both grooves 11 and 12 in the wall of the axial bore 8, a chamber 15 is provided including a circular part 16 that is manufactured in the same materials as the tube 3.

Two channels 17 and 18 in the cylindrical body 5 are preferably situated opposite each other of which the first shows a greater diameter than the second.

As shown in FIG. 4, part 2 of the plastic coupling has the same component part as part 1. However, the specific form of the cylindrical body 5 of part 2 has bore 6 but instead is provided on the outside with a screw thread 19 which can work together with the screw thread 7. By way of example, an embodiment is shown in FIG. 4 whereby the reinforcement 10 is omitted.

Figure 5:
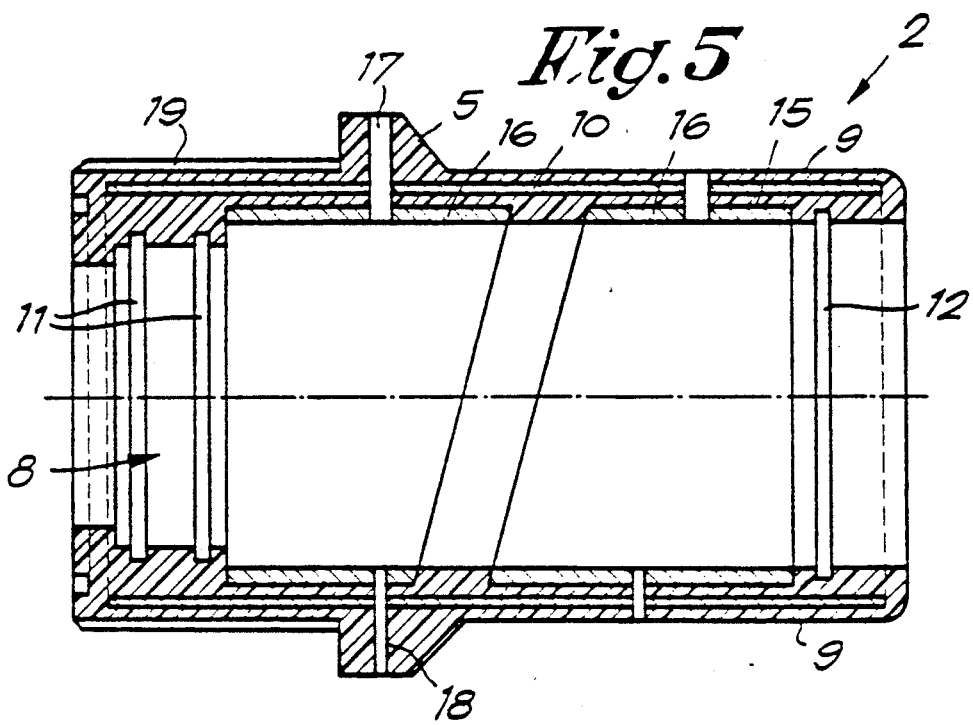
FIG. 5 shows a cross-section similar to that of FIG. 4 but for another embodiment.

As shown in the alternate embodiment of FIG. 5, several circular parts 16 could optionally be provided in the body 5. In the embodiment shown, use is made of two parts 16 which are obtained from a tubular part that is cut through at an angle. This construction offers the advantage that the circular parts under the influence of a possible twisting force cannot rotate in relation to the body 5. Radial bores 17 and 18 are preferably provided at the location of each ring or circular part 16 of which the purpose will be apparent from the rest of the description.

The manufacture of the above described parts 1 and 2 of the plastic coupling can easily be effected by moulding the plastic of the body 5 into an adapted form in which the circular part 16 and the perforated metal tube 10 were already installed beforehand, whereby the circular part 16 can be obtained by cutting a tube.

In order to attach the above described parts 1 and 2 of the plastic coupling onto the tubes 3 and 4, respectively, the tubes 3 and 4 are installed in the axial bore 8 and a suitable glue 20 is injected into the radial channel 17 until the glue oozes out of the other side through the channel 18.

The glue 20 thus spreads completely over the tangent plane between the ring or rings 16 and the tubes 3 and 4, whereby a lateral oozing out through the sealing rings 13 and 14 is prevented and the ring 16 adheres very strongly to the tubes 3 and 4.

By means of the respective screw threads 7 and 19, both parts 1 and 2 of the plastic coupling can thus be screwed tight to each other to realise a very strong coupling of both tubes 3 and 4. It is clear that this coupling can always be unscrewed again.

Figure 6:
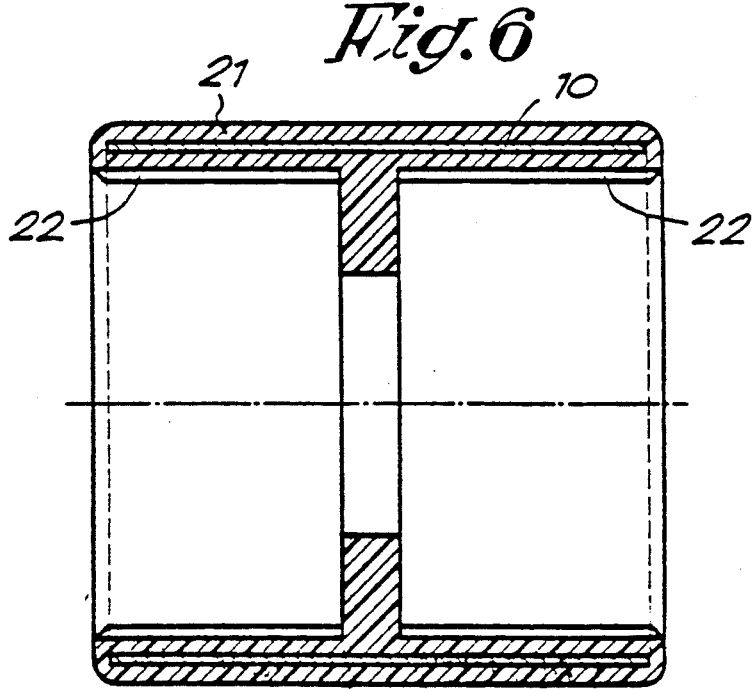
FIG. 6 shows a cross-section of a plastic coupling with the objective of connecting two similar couplings as FIG. 4 or 5 shows, to each other.

In order to be able to make use of two identical parts, either two parts 1 or two parts 2, connecting means can be applied, including a coupling with two identical parts which can be screwed to each other. An example of this is shown in FIG. 6, whereby this coupling 21 principally consists of a cylindrical body that is provided on both extremities with internal screw thread 22, such that this coupling 21 can work together with two parts 2. The coupling 21 preferably consists of plastic optionally provided with a reinforcement 10.

The plastic coupling can be manufactured of any suitable plastic. It is, however important that the rings 16 and the corresponding tube 3 or 4 are manufactured of the same material, or of another suitably adhering material. For the majority of applications, the rings 16 will consist of a metal, whereby both a ferrous as well as a non-ferrous metal can be applied, including, for example, a composite material or a plastic.

The present invention is in no way restricted to the embodiments described as examples and shown in the drawings, but such plastic coupling can be implemented in all kinds of forms and dimensions without departing from the scope of the present invention.

I claim:

1. A plastic coupling for connecting two tubes, comprising:
    a) first and second parts to be coupled together, each part being at least partially formed with a plastic body;
    b) the body including a first axial bore for receiving an extremity of a respective tube;
    c) the first bore having an inner wall thereon including a tubular ring at least partially forming a portion thereof and covering the entire circumference thereof, the tubular ring being formed of a material for adhering to the respective tube; and
    d) connecting means for coupling the first and second parts into substantial contact with each other.

2. Plastic coupling according to claim 1, further comprising a plurality of sides on the ring, each side having a peripheral groove and a sealing ring.

3. Plastic coupling according to claim 1, further comprising a first radial channel in the body at the location of the ring.

4. Plastic coupling according to claim 3, further comprising a second radial channel in the body (5) opposite the first radial channel.

5. Plastic coupling according to claim 1, wherein the connecting means on the first part are formed by a second axial bore connecting with the first axial bore in the body being provided with an internal screw thread and on the second part by an external screw thread which can cooperate with the internal screw thread.

6. Plastic coupling according to claim 1, wherein the plastic body of at least one of the parts is provided on the outside with two flat surfaces situated opposite each other.

7. Plastic coupling according to claim 1, further comprising a reinforcement in the plastic body.

8. Plastic coupling according to claim 7, wherein the reinforcement includes a perforated metal tube.

9. Plastic coupling according to claim 1, wherein at least one of the parts is provided with two rings covering the entire circumference.

10. Plastic coupling according to claim 9, wherein the two rings are formed of tubular parts cut off at an angle.

11. Plastic coupling according to claim 9, further comprising at least one radial opening on each ring.

12. Plastic coupling according to claim 1 wherein the connecting means with which both parts are coupled to each other includes a second coupling having two sides, on which the parts can be screwed.

13. Plastic coupling according to claim 12, wherein the second coupling to be placed between the two parts permits two identical parts to be connected to each other.

14. Plastic coupling according to claim 1, wherein the ring of at least one of the two parts comprises plastic material.

15. Plastic coupling according to claim 1, wherein the ring of at least one of the two parts comprises metal material.

16. Plastic coupling according to claim 1, wherein the ring of at least one of the two parts comprises composite material.

* * * * *